United States Patent [19]
Foster

[11] Patent Number: 5,355,994
[45] Date of Patent: Oct. 18, 1994

[54] REPLACEABLE WEAR SURFACE FOR CONVEYOR SLATS

[76] Inventor: Raymond K. Foster, P.O. Box 1, Madras, Oreg. 97741

[21] Appl. No.: 153,366

[22] Filed: Nov. 16, 1993

[51] Int. Cl.⁵ .......................................... B65G 25/00
[52] U.S. Cl. .................................. 198/750; 414/525.1
[58] Field of Search .................... 198/750; 414/525.1

[56] References Cited

U.S. PATENT DOCUMENTS

| | | | |
|---|---|---|---|
| 4,785,929 | 11/1988 | Foster | 198/750 |
| 4,821,868 | 4/1989 | Foster | 198/750 |
| 5,088,595 | 2/1992 | Hallstrom, Jr. | 198/750 |
| 5,125,502 | 6/1992 | Foster | 198/750 |
| 5,263,573 | 11/1993 | Hallstrom, Jr. | 198/750 |
| 5,267,641 | 12/1993 | Hallstrom, Jr. | 198/750 |

*Primary Examiner*—D. Glenn Dayoan
*Attorney, Agent, or Firm*—David P. Campbell

[57] ABSTRACT

A replaceable wear plate assembly for a reciprocating floor conveyor that includes a plurality of elongated slat members (12) mounted adjacent each other in a common plane. A replaceable wear plate (42) is provided for each slat member (12) of the reciprocating floor conveyor. The slat members are formed with a ridge (28, 30) and inwardly projecting lip (32, 34) extending along the side edges of each slat member. The ridge and lip portion form a slot (36, 38) along the side edges of the slat members for receiving the side edges of the replaceable wear plates. The ridge and lip portion and the edges of the wear plates form a tongue and groove arrangement whereby the movement of the wear plate is restricted sideways and in a vertical direction. A connector (48) is provided to secure each wear plate to its slat member in order to restrict movement of the wear plate longitudinally along its length.

20 Claims, 5 Drawing Sheets

REPLACEABLE WEAR SURFACE FOR CONVEYOR SLATS

TECHNICAL FIELD

This invention relates to improvements in reciprocating floor conveyors having a plurality of reciprocative conveyor slats, and in particular to a replaceable wear surface for covering and protecting the conveyor slats of a reciprocating floor conveyor. More specifically, this invention relates to replaceable plastic wear plates that are mounted on the top portions of the conveyor slats and which can be easily removed and replaced when sufficiently worn.

BACKGROUND OF THE INVENTION

Reciprocating floor conveyors are used in a wide variety of applications wherein the conveyor slats of the reciprocating floor conveyors are subject to a substantial amount of pounding and abuse. For example, garbage-hauling trailers, equipped with reciprocating floor conveyors, are used to haul solid waste material to disposal sites. At garbage dump stations, waste material is dumped into these open-top, garbage-hauling trailers and onto the conveyor slats of the reciprocating floor conveyor, which forms the floor of the trailer. As the waste material is dumped onto the reciprocating floor conveyor, heavy objects, some with sharp or protruding edges, pound and scrape the conveyor slats as the trailer is loaded. In some applications, a compactor compacts the loaded solid waste material downwardly against the conveyor slats, prior to the garbage being hauled to the disposal site. This compaction of the garbage greatly increases the forces that the reciprocating floor conveyor must withstand.

Reciprocating floor conveyors also are used in trailers for transporting fire wood debris comprising large sections of tree trunks and branches. Typically, a garbage truck dumps the wood debris from an elevated position above the trailer, whereby the heavy sections of tree trunks and branches crash down upon the conveyor slats of the reciprocating floor conveyor. As a result, the reciprocating floor conveyors can sustain a substantial amount of damage. Reciprocating floor conveyors are also used in stationary applications to convey scrap metal, tires, wheels, engines, and many other types of bulky waste products. Typically, these waste products, like garbage and wood debris, are dumped or channeled onto reciprocating floor conveyors and transported by the conveyors to a collection site.

Damage to the conveyor slats can result in the conveyor slats not reciprocating properly and in the conveyor slats leaking fluid underneath the conveyor. Solutions to this problem have included manufacturing the conveyor slats out of steel, rather than aluminum, to provide them sufficient strength for handling the impact forces to which reciprocating floor conveyors are subjected. However, the use of steel as a manufacturing material greatly increases the weight of the conveyors, which can be prohibitive for many applications, such as truck-and-trailer vehicles. A compromise solution to increase durability has been to secure a steel wear strip on the conveyor slats. In most cases, the steel wear strips covered and protected only portions of the conveyor slats. In all cases, the use of steel wear strips had an adverse affect on the weight of the reciprocating floor conveyors.

Accordingly, a principal object of the present invention is to provide an improved design for a reciprocating floor conveyor that is durable, yet lightweight, and avoids the problems discussed above with regard to prior art conveyors.

DISCLOSURE OF THE INVENTION

Briefly described, the present invention comprises a reciprocating slat conveyor including a plurality of side-by-side, elongated, longitudinally-movable conveyor slats. Each conveyor slat has opposite side portions, a top portion extending between the side portions, and a pair of laterally-spaced ridges, upstanding from the side portions. Each ridge includes a base and a laterally inwardly-directed slot in the base, adjacent the top portion. Each slot extends the full length of the conveyor slat, and each slot opens towards and confronts the slot in the other ridge. The reciprocating slat conveyor further includes an elongated wear plate for each conveyor slat. Each wear plate is adapted to rest on the top portion of the conveyor slat, between the ridges. Each wear plate includes opposite side edge portions, which fit into the slots in the ridges. The engagement of the wear plates and the slots restrains the wear plates against sideways and vertical movement relative to the conveyor slats.

According to a feature of the invention, at least one connector is provided for each wear plate, connecting the wear plate to its conveyor slat. The connectors restrain the wear plates against longitudinal movement relative to the conveyor slats.

According to another aspect of the invention, at least some of the wear plates include a cover flange at one side of the conveyor slat, extending from the wear plate up and over the ridge at such side of the conveyor slat and extending laterally over an adjacent ridge on an adjoining cover slat. The cover flanges cover the gaps between the side portions of adjacent conveyor slats.

According to another aspect of the invention, a seal is provided between adjacent conveyor slats below the cover flange. The seals seal the gaps between the side portions of adjacent conveyor slats.

According to another aspect of the invention, the cover flange slopes downwardly as it extends laterally outwardly over the side edge of an adjoining conveyor slat.

Other features and advantages of the present invention can be seen and understood by examination of the appended drawings, description of the best mode for carrying out the invention, and the claims, all of which are incorporated herein by reference as a portion of the disclosure of the present invention.

BRIEF DESCRIPTION OF THE DRAWINGS

Like reference numerals are used to indicate like parts throughout the various figures of the drawing, wherein.

BEST MODE FOR CARRYING OUT THE INVENTION

Figure 1:
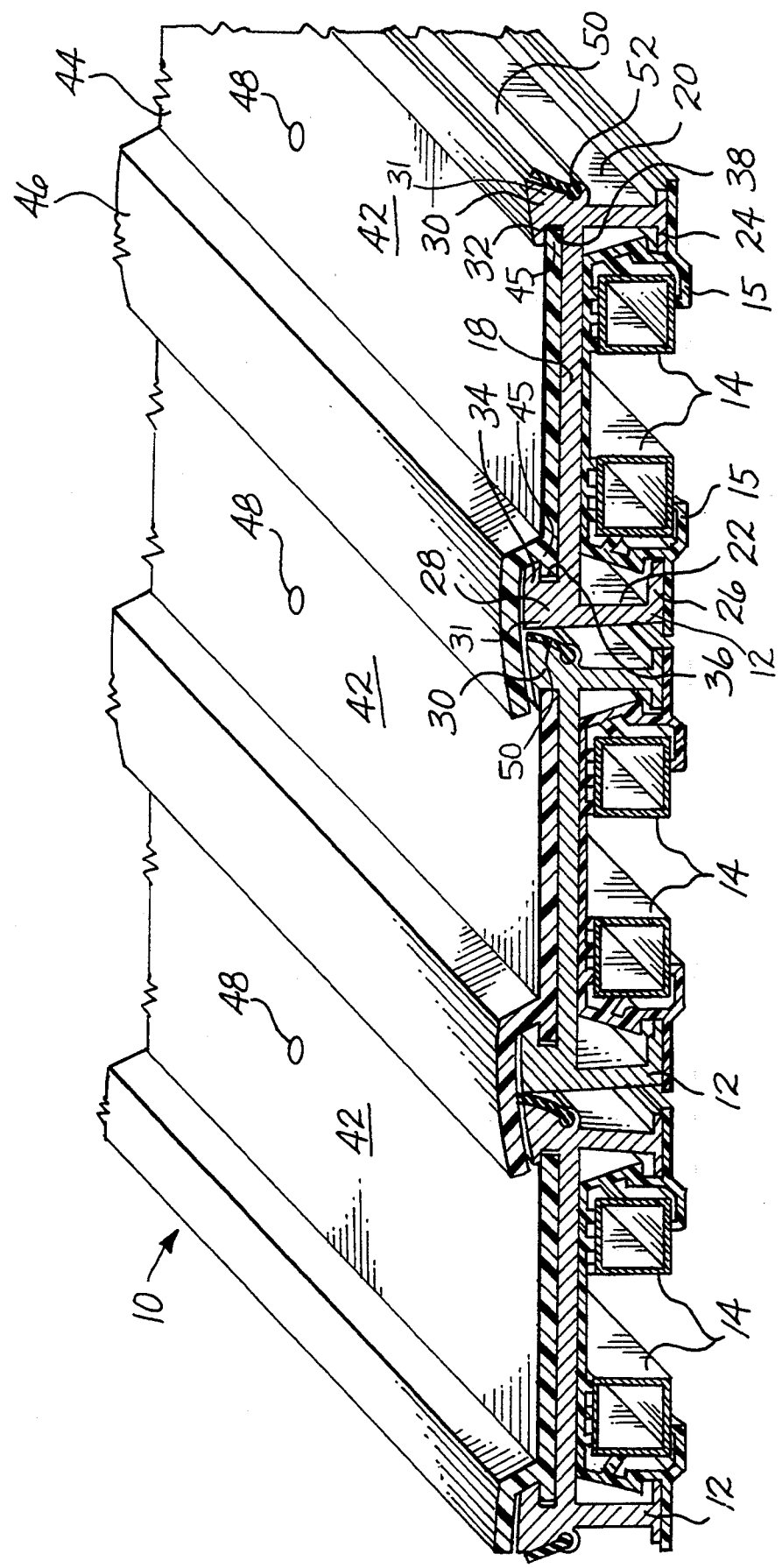
FIG. 1 is a fragmentary pictorial view of the replaceable wear plate assembly of the present invention shown mounted to adjacent conveyor slats of a reciprocating floor conveyor, which conveyor slats are each mounted atop pairs of guide beams.
Figure 2:
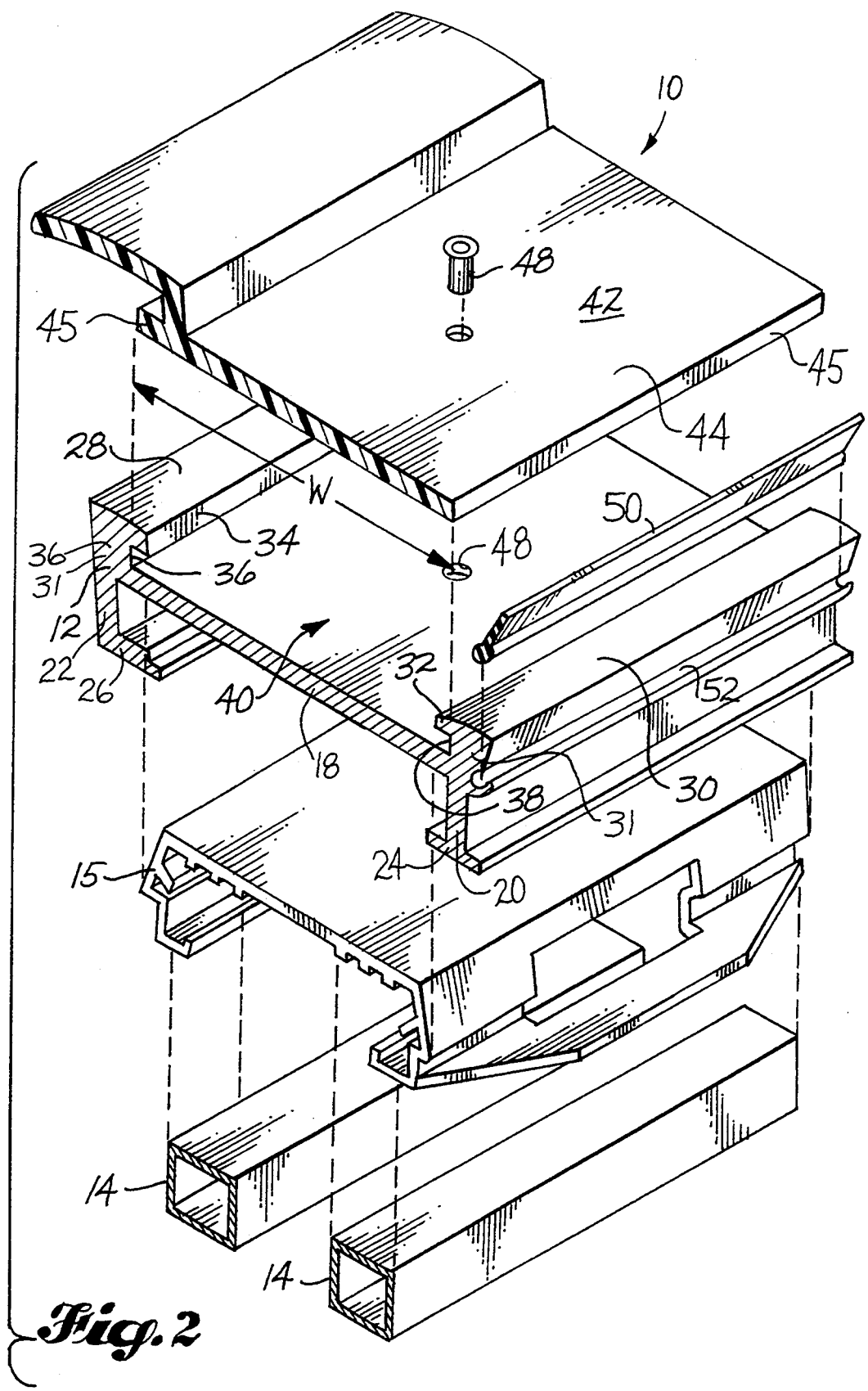
FIG. 2 is a fragmentary exploded pictorial view of a single replaceable wear plate and conveyor slat assembly of FIG. 1.

Referring now to the drawings, FIG. 1 shows the replaceable wear plate assembly 10 mounted to floor members or conveyor slats 12 of a reciprocating floor conveyor. FIG. 2 shows an exploded view of a single wear plate and conveyor slat assembly. The conveyor slats 12 and the drive mechanism for moving the conveyor slats are not, per se, a part of the present invention. By way of typical and therefore nonlimitive example, the drive mechanism may be like the drive mechanism disclosed in my U.S. Pat. No 5,125,502, granted Jun. 30, 1992, and entitled, "Drive Mechanism for A Reciprocating Floor Conveyor"; or my U.S. Pat. No. 4,821,868, granted Apr. 18, 1989 and entitled, "Drive/Frame Assembly for a Reciprocating Floor," both patents being incorporated herein by reference.

FIGS. 1 and 2 show some of the support framework for the reciprocating conveyor slats 12. The support framework includes longitudinal guide beams 14, which in the embodiment shown in FIGS. 1 and 2, comprise two guide beams 14 for each conveyor slat 12. The guide beams 14 are mounted to a plurality of transverse support beams (not shown), which form part of the support framework for the reciprocating floor conveyor. A bearing 15 is snap-fitted onto each pair of guide beams 14. Bearings 15 slidably support the conveyor slats 12 on the guide beams 14. Preferably, bearings 15 are made of a plastic material. The aforementioned patents disclose the bearings 15 and supporting framework in more detail.

Each conveyor slat 12 includes a top portion 18, a pair of sidewall portions 20, 22 extending downwardly from the top portion 18, a pair of bottom flanges 24, 26, which project inwardly from the sidewalls 20, 22, and a pair of laterally-spaced ridges 28, 30, which extend upwardly along the side edges of the conveyor slats 12. Ridges 28, 30 each include a base 31. Lips 32, 34 project laterally inwardly toward each other from base 31. Lips 32, 34 and bases 31 form slots 36, 38, which extend along the full length of the conveyor slats 12. Slots 36, 38 open towards and confront each other. The ridges 28, 30 also define a channel 40 (FIG. 2) along the top portions 18 of conveyor slats 12 for receiving wear plates 42.

Each wear plate 42 includes an elongated flat portion 44 having side edge portions 45. Flat portion 44 is generally rectangular in shape and has a width (W) (FIG. 2) sufficient so that the side edge portions 45 of wear plate 42 fit within slots 36, 38 extending along the sides of the conveyor slat 12. A cover flange 46 extends from adjacent one side of the flat portion 44 of wear plate 42 upwardly and above the ridge 28 extending along one side edge of the conveyor slat 12 and laterally over and above the ridge 30 of an adjoining conveyor slat 12. The wear plates 42 are preferably made of a structural plastic material, such as polyvinyl chloride.

The wear plates 42 are secured to the conveyor slats 12 by a single connector 48. Connectors 48 restrain the wear plates 42 against longitudinal movement relative to the conveyor slats 12. If the application so requires, each wear plate 42 can be secured to its conveyor slat 12 with more than one connector 48. Only one connector is shown in the drawings because, for many applications, a single connector is sufficient to secure each wear plate to a conveyor slat.

The flat portions 44 of wear plates 42 are received within the channels 40 of each conveyor slat 12 with a somewhat loose fit between the wear plate and the conveyor slat. This allows for variances in manufacture as well as for thermal expansion of the various components. As the conveyor slats of the reciprocating floor conveyor are moved back and forth to convey a load along the reciprocating floor conveyor, the conveyor slats have a tendency to buckle or push upwardly. The lips 32, 34 projecting inwardly from the bases 31 of the conveyor slats hold the wear plates 42 down within the channels 40 of the conveyor slats 12 and prevent any tendency of the wear plates to buckle.

The wear plates 42 are restrained laterally and vertically by the conveyor slats 12. The ridges 28, 30 restrict movement of the wear plates 42 laterally and upwardly, while the top portions 18 support the wear plates 42.

To install the wear plates on the conveyor slats, or to replace the wear plates after they have worn out, the connectors are removed and the plates are slid along the length of the conveyor slats until they are free of the slats 36, 38.

Seal strips 50 are provided between the conveyor slats 12 along the upper portion of the conveyor slats adjacent the ridges 28, 30. The seal strips 50 are held in a groove 52, and the upper end of the seal strip 50 bears against the side of an adjacent conveyor slat 12. The seal strips 50 prevent any moisture or small particles from penetrating between the conveyor slats and falling beneath the reciprocating floor conveyor.

Figure 3:
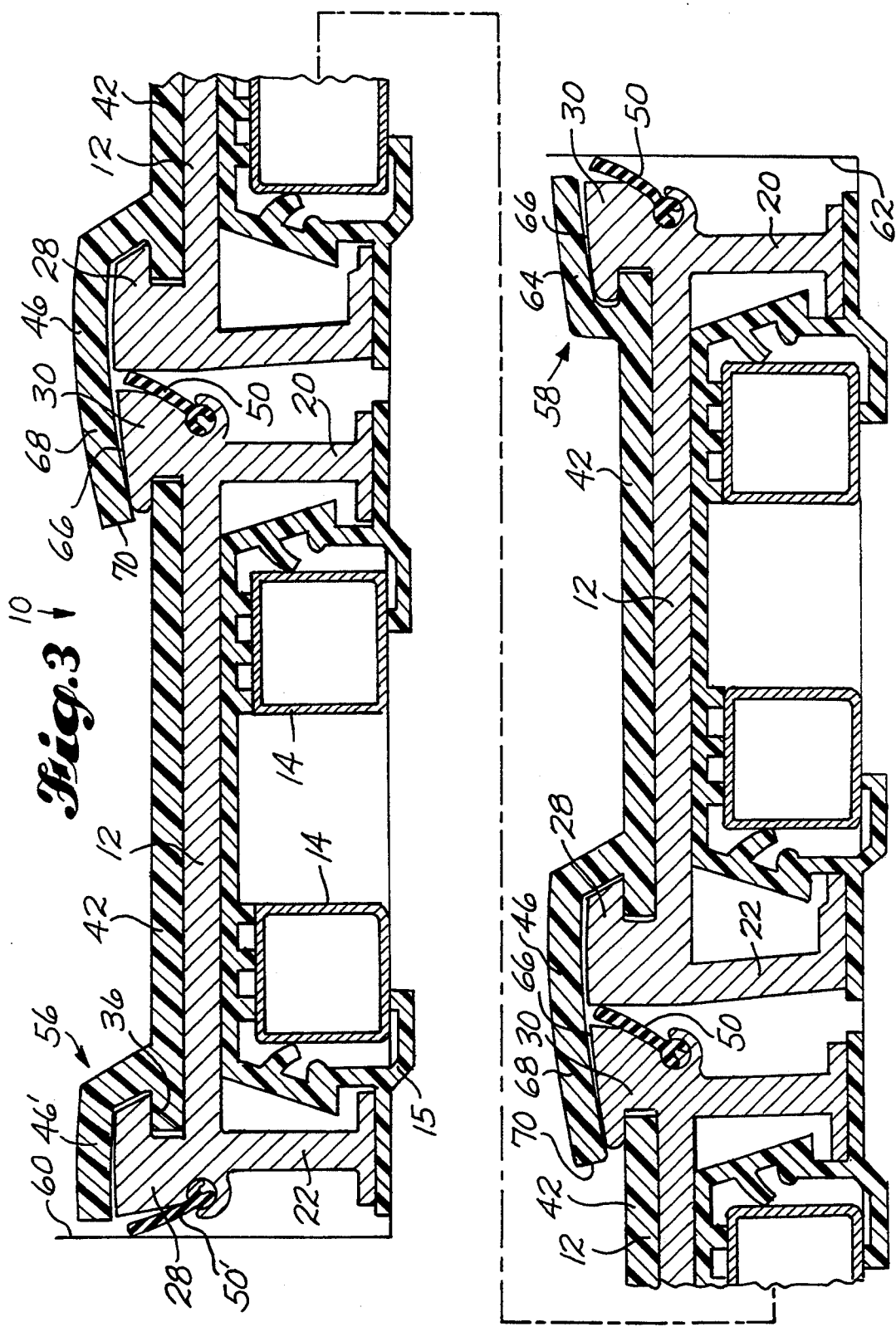
FIG. 3 is a sectional view of the wear plate assembly and reciprocating floor conveyor of FIG. 1 shown adjacent sidewalls of a cargo container in which the reciprocating floor conveyor is mounted.

FIG. 3 is a sectional view of the wear plate assembly 10 of the present invention illustrating the design of the lateral side edges of the assembly, which side edges abut sidewalls of a cargo container. As shown in FIG. 3, the assembly includes a first side edge 56 and a second side edge 58. Side edge 56 abuts a sidewall 60 of the cargo container in which the reciprocating floor conveyor is mounted, and side edge 58 abuts a sidewall 62 of the cargo container. At side edge 56, the cover flange 46' of the wear plate 42 extends up and over side ridge 28 and stops at the outer edge of ridge 28. A seal 50' is provided along the outer edge of the conveyor slat 12. Seal 50' abuts sidewall 60 to create a sealing engagement between the sidewall and the conveyor slat. At the opposite side edge 58 of the assembly, the wear plate 42 adjacent sidewall 62 includes a second cover flange 64 in addition to cover flange 46. Cover flange 64 extends upwardly and laterally outwardly above ridge 30 and stops at the outward edge of ridge 30. Seal 50 is provided along ridge 30 to seal conveyor slat 12 and sidewall 62.

As best shown in FIG. 3, ridges 30 of each conveyor slat 12 include an inwardly-sloping top edge 66. Cover flanges 46 are formed with a corresponding downwardly-sloping outer portion 68. This arrangement brings the outer lateral edge 70 of the cover flanges 46 into closer proximity with the wear plate 42 of an adjoining conveyor slat. As a result, the gap between adjacent wear plates 42 is small and the potential for debris to work its way underneath the cover flange 46 and the ridges 28, 30 is reduced.

Figure 4:
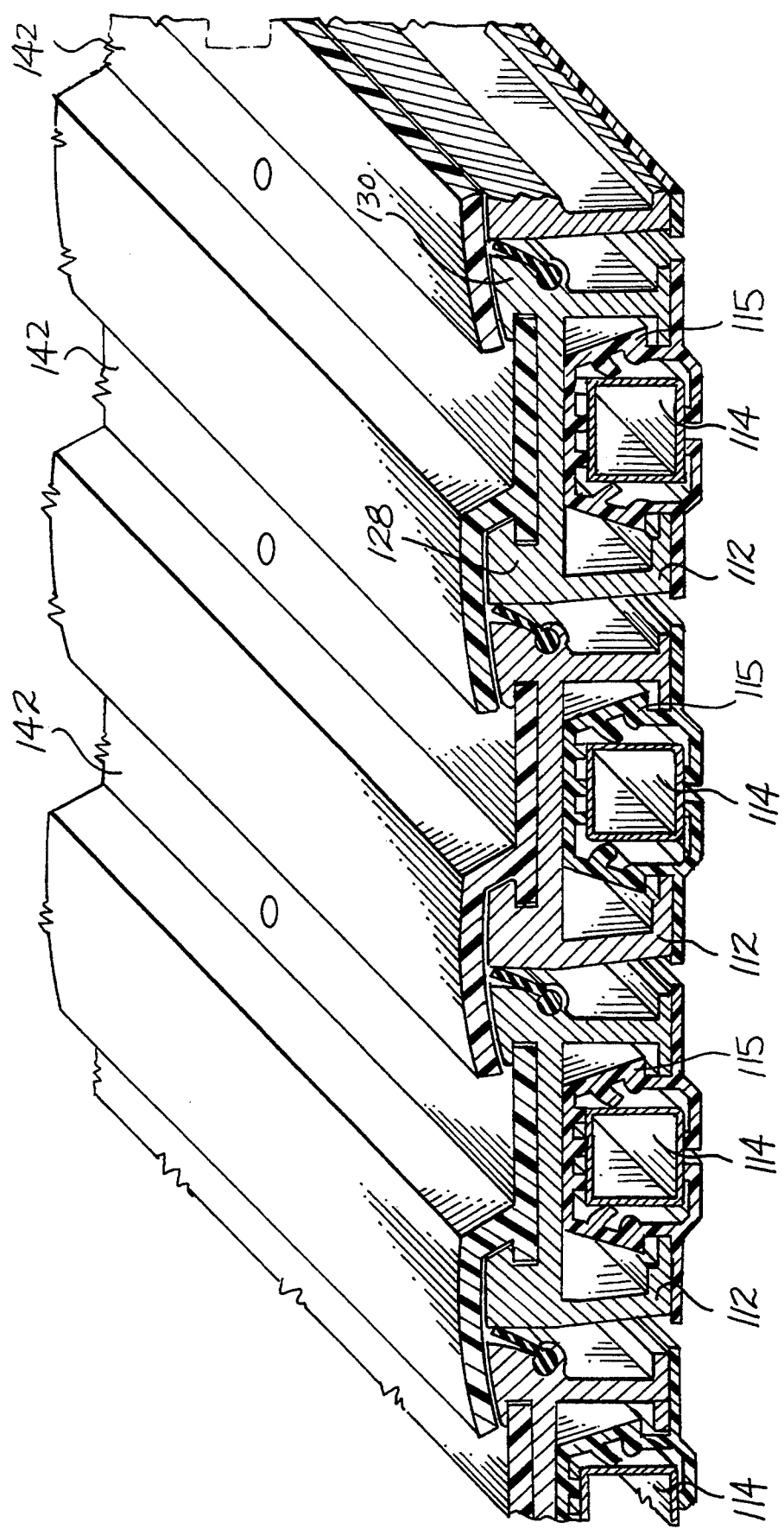
FIG. 4 is a fragmentary pictorial view of the replaceable wear plate assembly of FIG. 1 shown secured to conveyor slats that are each mounted on a single guide beam.
Figure 5:
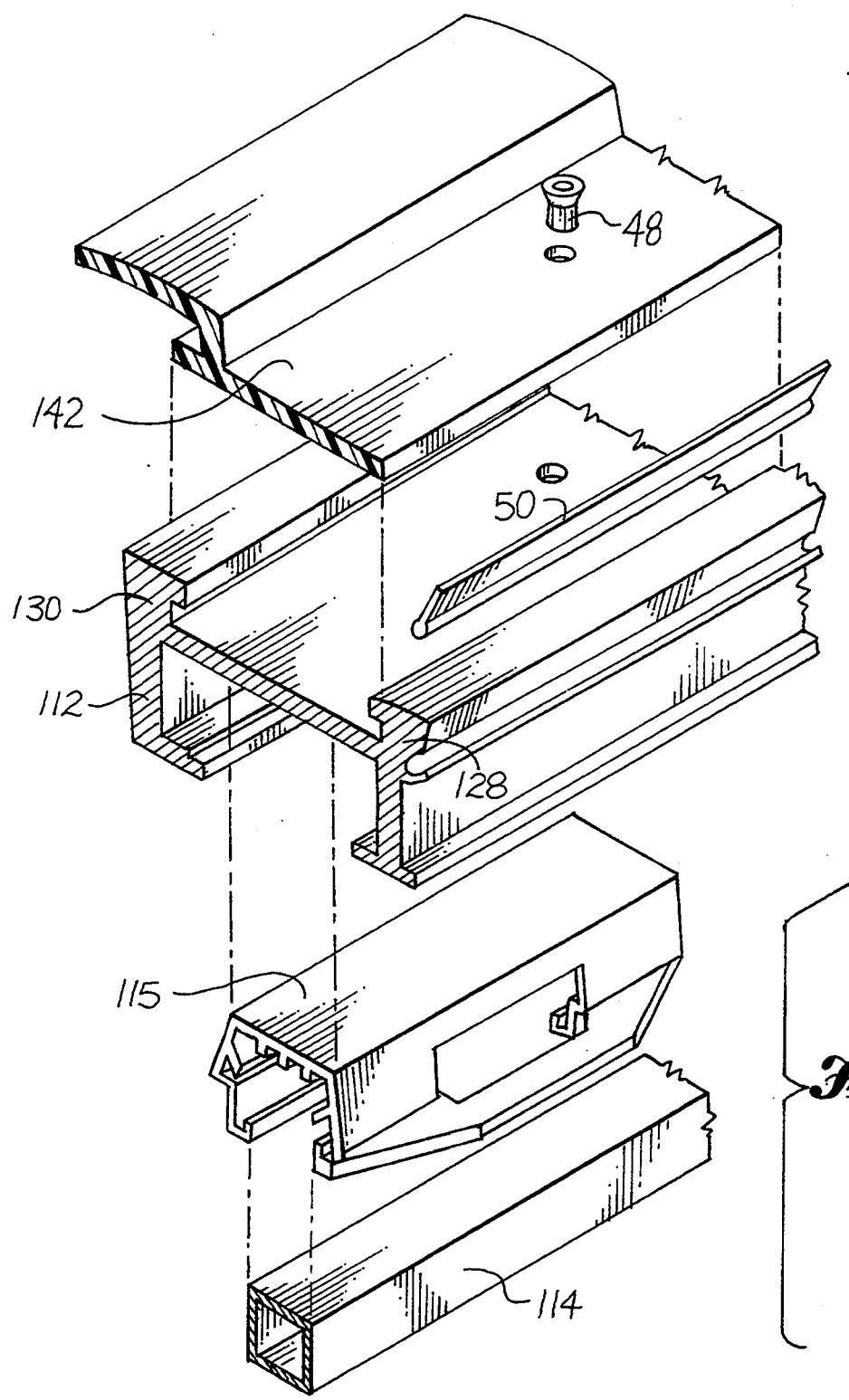
FIG. 5 is an exploded pictorial view of the replaceable wear plate assembly of FIG. 4.

FIGS. 4 and 5 show an alternative application for the replaceable wear plates 142. Certain reciprocating floor conveyors are designed with only a single guide beam 114 for supporting each conveyor slat 112. In such an arrangement, the conveyor slats 112 and bearings 115 are typically narrower than the conveyor slats of FIGS. 1 and 2. However, the design of the wear plates 142 and the ridges 128, 130 of the conveyor slats 112 are substantially the same.

As can be seen, the wear plates cover the entire surface of the conveyor slats and, thus, provide a protective shield over the slats. The cover flanges of the wear plates cover the seams between adjacent slats and, thus, assist in preventing moisture or debris from getting beneath the conveyor. The wear plates being plastic makes them more receptive to the pounding and abuse that reciprocating floor conveyors are subject to and, being relatively inexpensive, are replaceable when worn at relatively little cost.

It should be noted that there are other designs, as well, for the conveyor slats 12 to which wear plates 42 can be mounted, which designs are well known in the art and used for a variety of reciprocating floor conveyor applications. The replaceable wear plate assembly of the present invention is equally adaptable to other reciprocating floor conveyor designs wherein the conveyor slats are mounted adjacent each other to form the floor of the reciprocating floor conveyor.

It is to be understood that many variations in size, shape, and construction can be made to the illustrated and abovedescribed embodiment without departing from the spirit and scope of the present invention. Some of the features of the preferred embodiment may be utilized without other features. Therefore, it is to be understood that the presently-described and illustrated embodiment is nonlimitive and is for illustration only. Instead, my patent protection is to be limited only by the following claim or claims interpreted according to accepted doctrines of claim interpretation, including the doctrine of equivalents and reversal of parts.

What is claimed is:

1. A reciprocating slat conveyor, comprising:
    a plurality of side-by-side, elongated, longitudinally movable conveyor slats;
    each conveyor slat having opposite side portions, a top portion extending between the side portions, and a pair of laterally-spaced ridges, upstanding from the side portions;
    each ridge including a base and a laterally, inwardly-directed slot in said base, adjacent the top portion, each slot extending the full length of the conveyor slat, and each slot opening towards and confronting the slot in the other ridge; and
    an elongated wear plate for each conveyor slat adapted to rest on the top portion of the conveyor slat, between the ridges, each wear plate including opposite side edge portions which fit into the slots in the ridges, said engagement of the wear plates and the slots restraining the wear plates against sideways and vertical movement relative to the conveyor slats.

2. A reciprocating slat conveyor according to claim 1, further comprising at least one connector for each wear plate, connecting it to its conveyor slat, to restrain the wear plate against longitudinal movement relative to the conveyor slat.

3. A reciprocating slat conveyor according to claim 1, wherein at least some of the wear plates include a cover flange at one side of the conveyor slat, extending from the wear plate up and over the ridge at such side of the conveyor slat and extending laterally over an adjacent ridge on an adjoining conveyor slat.

4. A reciprocating slat conveyor according to claim 3, further comprising at least one connector for each wear plate, connecting it to its conveyor slat, to restrain the wear plate against longitudinal movement relative to the conveyor slat.

5. A reciprocating slat conveyor according to claim 1, wherein the wear plates are made from a structural plastic material.

6. A reciprocating slat conveyor according to claim 5, wherein the wear plates are made from polyvinyl fluoride.

7. A reciprocating slat conveyor according to claim 5, further comprising at least one connector for each wear plate, connecting it to its conveyor slat, to restrain the wear plate against longitudinal movement relative to the conveyor slat.

8. A reciprocating slat conveyor according to claim 3, wherein the wear plates are made from a structural plastic material.

9. A reciprocating slat conveyor according to claim 4, wherein the wear plates are made from a structural plastic material.

10. A reciprocating slat conveyor according to claim 3, further comprising a seal between adjacent conveyor slats below the cover flange.

11. A reciprocating slat conveyor according to claim 3, wherein said adjacent ridge on the adjoining conveyor slat has an upper surface which slopes downwardly as it extends laterally inwardly, and said cover flange slopes downwardly as it extends laterally outwardly and said cover flange is contiguous the upper surface of said adjacent ridge.

12. For use with a conveyor slat in a reciprocating slat conveyor:
    a wear plate comprising an elongated body having opposite side edges, said body in use setting down on a top portion of a conveyor slat which has upstanding ridges at the sides of the top portion and confronting slots in the ridges,
    said body being of a width to cover the top portion of the conveyor slat with its opposite side edges fitting within the confronting slots in the ridges, and
    said wear plate including a cover flange along one side edge of the wear plate, extending first upwardly from the body of the wear plate and then laterally outwardly, said cover flange being at least of a sufficient width to extend over and cover the ridge on the conveyor slat to which the wear plate is secured.

13. A reciprocating slat conveyor according to claim 12, wherein the wear plate is made from a structural plastic material.

14. A reciprocating slat conveyor according to claim 12, wherein the cover flange slopes downwardly as it extends laterally outwardly.

15. A reciprocating slat conveyor according to claim 12, wherein the cover flange is of sufficient width to extend over and cover both the ridge on the conveyor slat to which the wear plate is secured and an adjacent ridge on an adjoining conveyor slat.

16. A reciprocating slat conveyor according to claim 15, wherein the wear plate is made from a structural plastic material.

17. A reciprocating slat conveyor according to claim 15, wherein the cover flange slopes downwardly as it extends outwardly.

18. A reciprocating slat conveyor according to claim 10, and further comprising seals between the sidewalls and conveyor slats adjacent the sidewalls.

19. A reciprocating slat conveyor according to claim 12, and further comprising a seal between adjacent conveyor slats.

20. A reciprocating slat conveyor according to claim 3, wherein at least one of the wear plates adjacent a sidewall includes a second cover flange extending from the wear plate laterally up and over the ridge not covered by the first cover flange.

* * * * *